(12) United States Patent
Kim et al.

(10) Patent No.: US 11,672,055 B2
(45) Date of Patent: Jun. 6, 2023

(54) INDUCTION HEATING DEVICE HAVING IMPROVED FERRITE CORE SHAPE

(71) Applicant: LG Electronics Inc., Seoul (KR)

(72) Inventors: Seongjun Kim, Seoul (KR); Jaekyung Yang, Seoul (KR); Yongsoo Lee, Seoul (KR)

(73) Assignee: LG Electronics Inc., Seoul (KR)

(*) Notice: Subject to any disclaimer, the term of this patent is extended or adjusted under 35 U.S.C. 154(b) by 766 days.

(21) Appl. No.: 16/678,775

(22) Filed: Nov. 8, 2019

(65) Prior Publication Data
US 2020/0154532 A1    May 14, 2020

(30) Foreign Application Priority Data

Nov. 8, 2018   (KR) ..................... 10-2018-0136324

(51) Int. Cl.
*H05B 6/36*   (2006.01)
*H05B 6/12*   (2006.01)

(52) U.S. Cl.
CPC ........... *H05B 6/365* (2013.01); *H05B 6/1245* (2013.01)

(58) Field of Classification Search
CPC ............ H05B 2206/022; H05B 6/1218; H05B 6/1245; H05B 6/1254; H05B 6/1263; H05B 6/365; Y02B 40/00
USPC ........ 219/671, 622, 624, 672, 675, 676, 677
See application file for complete search history.

(56) References Cited

U.S. PATENT DOCUMENTS

| 8,440,944 B2 | 5/2013 | Acero et al. |
| 2007/0278215 A1* | 12/2007 | Schilling ............. H05B 6/1263 219/622 |
| 2019/0297687 A1 | 9/2019 | Kim et al. |

FOREIGN PATENT DOCUMENTS

| EP | 3544378 | 9/2019 | |
| WO | WO-2018153976 A1 * | 8/2018 | ............. H05B 6/103 |
| WO | WO2019221577 | 11/2019 | |

OTHER PUBLICATIONS

Extended European Search Report in European Application No. 19207383.1, dated Mar. 19, 2020, 7 pages.

* cited by examiner

*Primary Examiner* — Jimmy Chou
*Assistant Examiner* — Ket D Dang
(74) *Attorney, Agent, or Firm* — Fish & Richardson P.C.

(57) ABSTRACT

An induction heating device includes: a working coil including a conducting wire that is wound in an annular shape and that is connected to a plurality of electric terminals; a ferrite core disposed vertically below the working coil and configured to direct upward an alternating magnetic field generated by the working coil, the ferrite core defining a stepped portion at each corner of the ferrite core; a base plate that supports the ferrite core on an upper surface of the base plate and that defines a connection hole having a shape corresponding to the corner of the ferrite core; and an indicator substrate disposed vertically below the base plate. The indicator substrate includes a connector that is disposed on an upper surface of the indicator substrate, that is coupled to one or more of the plurality of electric terminals, and that protrudes upward through the connection hole.

19 Claims, 12 Drawing Sheets

INDUCTION HEATING DEVICE HAVING IMPROVED FERRITE CORE SHAPE

CROSS-REFERENCE TO RELATED APPLICATION

The present disclosure claims priority to and the benefit of Korean Patent Application No. 10-2018-0136324, filed on Nov. 8, 2018, the disclosure of which is incorporated herein by reference in its entirety.

TECHNICAL FIELD

The present disclosure relates to an induction heating device having an improved shape of a ferrite core.

BACKGROUND

Various types of cooking apparatus may be used to heat food in homes and restaurants. For example, gas ranges use gas as fuel. In some examples, cooking devices may heat an object such as a cooking vessel, for example, a pot, with electricity instead of gas.

A method of heating an object via electricity may be classified into a resistive heating method and an induction heating method. In the electrical resistive method, heat may be generated based on current flowing through a metal resistance wire or a non-metallic heating element, such as silicon carbide, and the heat may be transmitted to the object (e.g., the cooking vessel) through radiation or conduction. In the induction heating method, eddy current may be generated in the object made of metal based on a magnetic field generated around the coil based on a high-frequency power having a predetermined magnitude applied to the coil to heat the object.

The induction heating devices that use an induction heating method may include working coils located respectively in corresponding regions to heat each of a plurality of objects (e.g., cooking vessels).

In some cases, an induction heating device (i.e., a zone-free type induction heating device) may simultaneously heat one object with a plurality of working coils has been widely used.

In some cases, a zone-free type induction heating device may inductively heat an object regardless of a size and a position of the object that is located in a region in which a plurality of working coils are present.

FIGS. 1 to 3 respectively show an examples of a working coil assembly provided in an induction heating device in related art.

Referring to FIGS. 1 to 3, a working coil assembly 10 of the induction heating device in related art may include a working coil 16, mica sheets 18 and 20, and a ferrite core 26.

The working coil 16 may have a circular outer contour 22 and the ferrite core 26 may have a radial outer edge 24. The ferrite core 26 has a hexagonal shape and a size of the ferrite core 26 may be greater than the size of the working coil 16.

In some cases, the ferrite core may have a size greater than the size of the working coil, and an amount of magnetic flux being leaking below the working coil may be reduced. Thus, the ferrite core has the size greater than the size of the working coil, and high-output may be obtained based on a relatively less current.

In the induction heating device in related art, a moving path 36 for a terminal 38 (i.e., an individual terminal and a common terminal) of the working coil 16 may be provided on the ferrite core 26. In some cases, a small-sized working coil may be used to provide a distance between ferrite cores and a creepage distance to prevent electric shock accidents.

In some examples, the terminal 38 of the working coil 16 may be tied using a housing and may be fastened to a resonance substrate.

The terminal 38 of the working coil 16 may be tied using the housing and fastened to the resonance substrate, a resonance capacitor may be disposed below the working coil 16 (i.e., the working coil 16 and the resonance capacitor may have a one-to-one correspondence). That is, when the zone-free type induction heating device uses the above-described fastening method, the size of the product may be increased due to the resonance capacitor disposed in the product.

In some cases, where a high-output working coil (i.e., a large-sized working coil) is used, the common terminal and the individual terminal of the working coil may not be tied using the housing. As the size of the resonance capacitor is increased based on the output of the working coil, it may become difficult to provide a space to place a plurality of resonance capacitors in the product.

SUMMARY

The present disclosure describes an induction heating device capable of using a high-output working coil.

The present disclosure also describes an induction heating device that prevents contact between a terminal of a ferrite core and a terminal of a working coil.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and advantages of the present disclosure may be implemented by means defined in claims and a combination thereof.

According to one aspect of the subject matter described in this application, an induction heating device includes: a working coil including a conducting wire that is wound in an annular shape and that is connected to a plurality of electric terminals; a ferrite core disposed vertically below the working coil and configured to direct upward an alternating magnetic field generated by the working coil, the ferrite core defining a stepped portion at each corner of the ferrite core; a base plate that supports the ferrite core on an upper surface of the base plate and that defines a connection hole having a shape corresponding to the corner of the ferrite core; and an indicator substrate that is disposed vertically below the base plate, where the indicator substrate include a connector that is disposed on an upper surface of the indicator substrate, that is coupled to one or more of the plurality of electric terminals, and that protrudes upward through the connection hole.

Implementations according to this aspect may include one or more of the following features. For example, the connection hole may be defined at an oblique position with respect to the ferrite core and has a rectangular shape, and the corner of the ferrite core may be curved inward to thereby define the stepped portion corresponding to a corner of the connection hole. In some examples, the connector may be spaced apart from an edge of the connection hole and coupled to the one or more of the plurality of electric terminals without contacting the ferrite core.

In some implementations, the working coil may include: a first working coil; a second working coil disposed at a first side of the first working coil; a third working coil disposed at a second side of the first working coil and disposed at an oblique position relative to the second working coil; a fourth working coil that is disposed at an oblique position relative to the first working coil and that faces the second working coil and the third working coil; a fifth working coil that is disposed at a side of the third working coil and that is disposed at an oblique position relative to the fourth working coil; and a sixth working coil that is disposed at a side of the fourth working coil, that is disposed at an oblique position relative to the third working coil, and that faces the fourth working coil and the fifth working coil. The ferrite core may include a first ferrite core disposed vertically below the first working coil, a second ferrite core disposed vertically below the second working coil, a third ferrite core disposed vertically below the third working coil, a fourth ferrite core disposed vertically below the fourth working coil, a fifth ferrite core disposed vertically below the fifth working coil, a sixth ferrite core disposed vertically below the sixth working coil. The connection hole may include: a first connection hole that has a rectangular shape defined by a first corner of each of the first ferrite core, the second ferrite core, the third ferrite core, and the fourth ferrite core, and a second connection hole that has a rectangular shape defined by a second corner of each of the third ferrite core, the fourth ferrite core, the fifth ferrite core, and the sixth ferrite core.

In some examples, the first corner of each of the first ferrite core, the second ferrite core, the third ferrite core, and the fourth ferrite core may be curved inward and respectively correspond to one of four corners of the first connection hole, and the second corner of each of the third ferrite core, the fourth ferrite core, the fifth ferrite core, and the sixth ferrite core may be curved inward and respectively correspond to one of four corners of the second connection hole. In some examples, the connector may include a plurality of connectors may include: four connectors disposed in the first connection hole and spaced apart from an edge of the first connection hole; and two connectors disposed in the second connection hole and spaced apart from an edge of the second connection hole.

In some examples, each of the first working coil, the second working coil, the third working coil, and the fourth working coil may extend to one of the four connectors disposed in the first connection hole and may be connected to one of the plurality of electric terminals, and each of the fifth working coil and the sixth working coil may extend to the two connectors disposed in the second connection hole and may be connected to one of the plurality of electric terminals.

In some implementations, the induction heating device may further include a first mica sheet disposed between the working coil and the ferrite core and configured to block heat transfer from the working coil to the ferrite core. In some examples, the first mica sheet may include a stepped part that is curved inward from a corner of the first mica sheet and that corresponds to the stepped portion of the ferrite core. In some examples, the first mica sheet may be fixed to the working coil and the ferrite core by a sealant.

In some examples, a creepage distance between a lower surface of the working coil and the base plate may be greater than or equal to 6.4 mm.

In some implementations, the induction heating device may further include a second mica sheet fixed to an upper end of the working coil by a sealant. In some implementations, the indicator substrate, the base plate, the ferrite core, the first mica sheet, and the working coil are stacked along a height direction, where the ferrite core defines a core hole at a center area of the ferrite core that corresponds to an annular inner side of the working coil, the first mica sheet defines a first sheet hole at a center area of the first mica sheet that corresponds to the annular inner side of the working coil, and the base plate defines a plate hole at a position corresponding to the annular inner side of the working coil. The core hole, the first sheet hole, and the plate hole may have a same shape and be coaxially arranged along the height direction.

In some implementations, the induction heating device may further include: a packing gasket configured to fix the first mica sheet and the ferrite core to the base plate, where an outer circumferential surface of the packing gasket is fastened to the first sheet hole, the core hole, and the plate hole, and has a cross-sectional shape corresponding to a shape of the first sheet hole; and a sensor disposed at an upper end of the packing gasket and configured to detect a temperature of the packing gasket.

In some implementations, the induction heating device may further include an insulating member attached to an outer portion of the ferrite core and configured to insulate between the working coil and the base plate. In some examples, the insulating member may cover an upper surface, a side surface, and a lower surface of the outer portion of the ferrite core, and a length of the insulating member in a longitudinal direction of the insulating member is less than a length of the outer portion of the ferrite core in the longitudinal direction. In some implementations, the outer portion of the ferrite core may be disposed between corners of the ferrite core.

In some implementations, the induction heating device may further include: an indicator substrate support having an upper surface that supports the indicator substrate; an inverter substrate that is disposed on a lower surface of the indicator substrate support and that includes an inverter configured to apply a resonance current to the working coil and a first heat sink configured to dissipate heat generated by the inverter; and a resonance substrate that is disposed on the lower surface of the indicator substrate support and that includes a resonance capacitor configured to generate the resonance current and a second heat sink configured to dissipate heat generated by the resonance capacitor.

In some implementations, the plurality of electric terminals may include a first terminal connected to the resonance capacitor, and a second terminal connected to the inverter through the connector. In some examples, the working coil may include a plurality of working coils, and the ferrite core may include a plurality of ferrite cores disposed vertically below the plurality of working coils, respectively. The connector may include four connector plates that are spaced apart from one another and that are arranged along a rectangular periphery defined by corners of four ferrite cores among the plurality of ferrite cores, where the connection hole is disposed within the rectangular periphery defined by the corners of the four ferrite cores.

In some implementations, the induction heating device may provide a creepage distance to insulate the working coil by adding an insulating member, rather than a reduction of a size of the working coil, so that the induction heating device may use a high-output working coil.

In some implementations describes, the induction heating device may include a ferrite core having corners curved or bent stepwise, a base plate defining a connection hole having a shape corresponding to a shape of the corner of the ferrite core, and an indicator substrate in which a connector coupled to a common terminal of the working coil is provided on an upper surface of the indicator substrate and the connector coupled to the common terminal of the working coil protrudes upward through a connection hole, thereby preventing the contact between the terminal of the ferrite core and the terminal of the working coil.

In some implementations describes, the induction heating device may use the high-output working coil, thereby improving performance and reliability of the product.

In some implementations describes, the induction heating device may prevent electric shock accidents by preventing contact between the terminal of the ferrite core and the terminal of the working coil, thereby improving user satisfaction.

Hereafter, a specific effect of the present disclosure, further to the above-mentioned effect, is described together while describing a specific matter for implementing the present disclosure.

DETAILED DESCRIPTION

Figure 1:
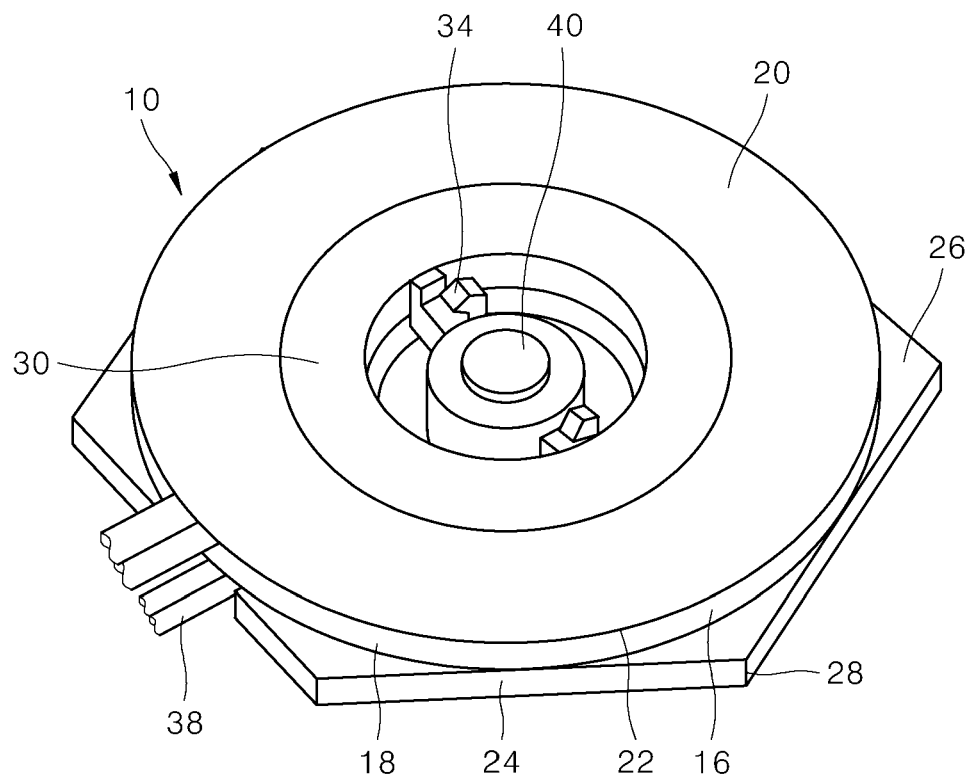
FIGS. 1 to 3 respectively show an example of a working coil assembly provided in an induction heating device in related art.
Figure 2:
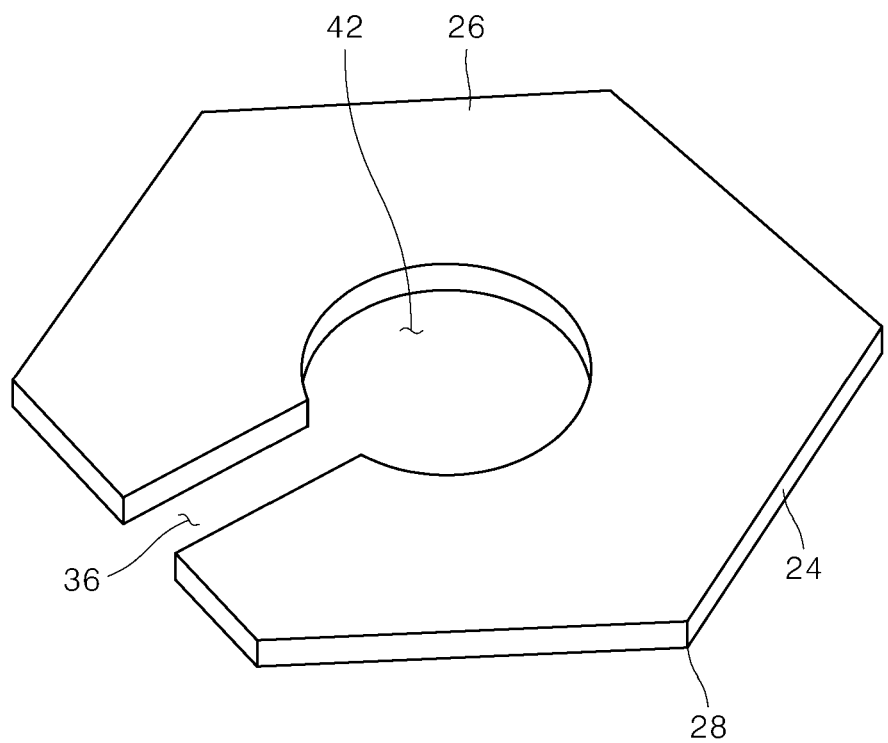

The above mentioned objects, features, and advantages of the present disclosure are described in detail with reference to the accompanying drawings, so that those skilled in the art to which the present disclosure pertains may easily implement the technical idea of the present disclosure. In the description of the present disclosure, when it is determined that the detailed description of the known technology related to the present disclosure may obscure the gist of the present disclosure, the detailed description thereof is omitted. Hereinafter, preferred implementations of the present disclosure are described in detail with reference to the accompanying drawings. A same reference numeral in the drawings is used to indicate same or similar component.

Hereinafter, an induction heating device is described according to an implementation of the present disclosure.

Figure 4:
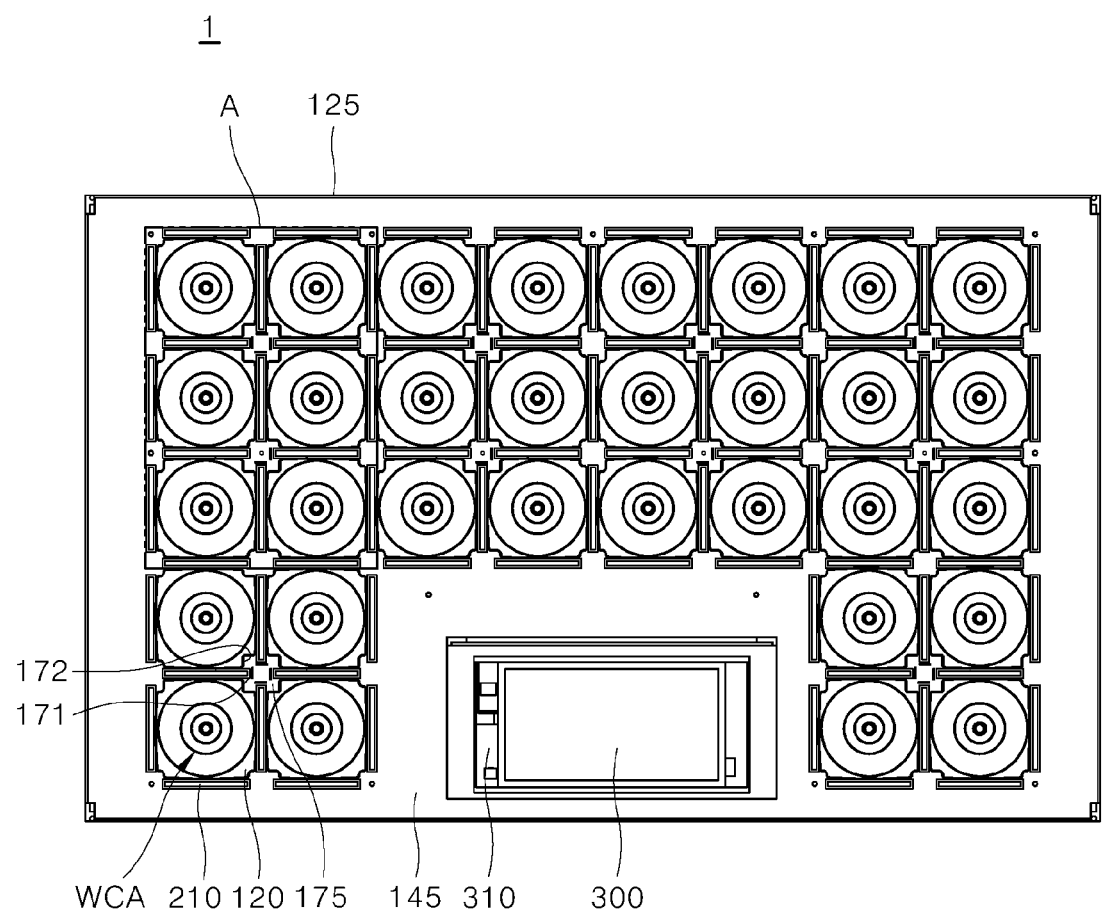
FIG. 4 is a plan view showing an example of an induction heating device according to one implementation of the present disclosure.
Figure 5:
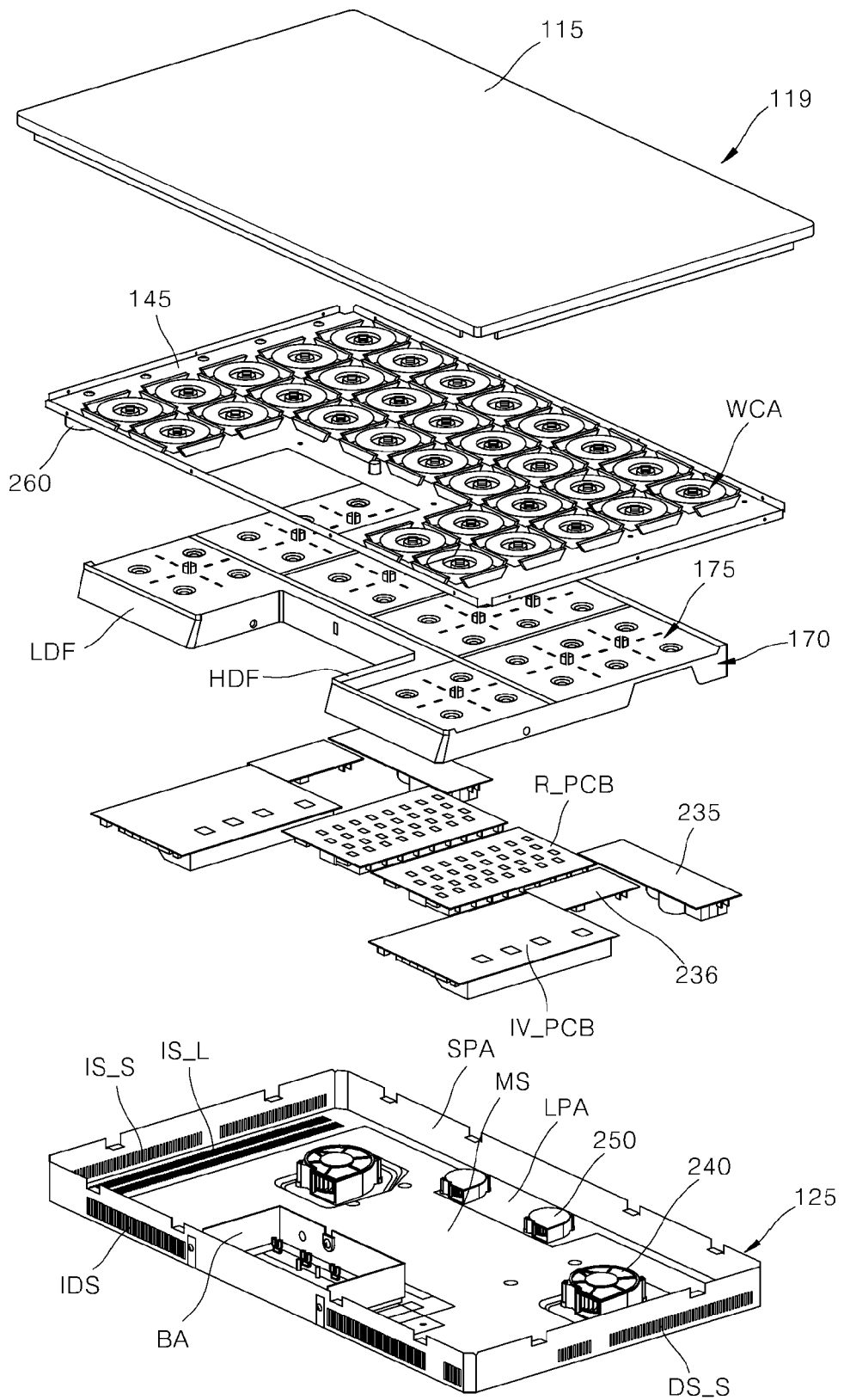
FIG. 5 is an exploded perspective view showing the induction heating device in FIG. 4.
Figure 6:
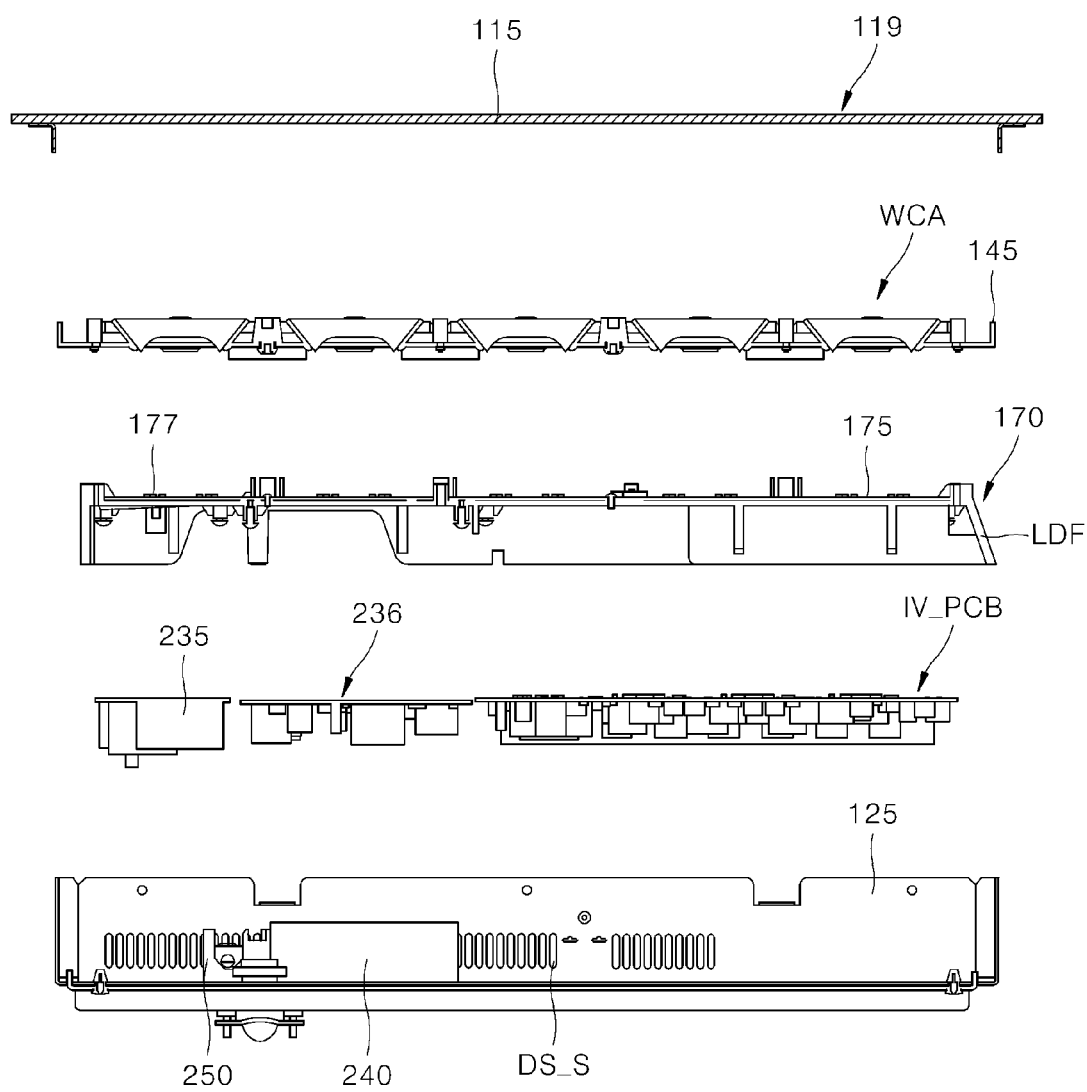
FIG. 6 is a cross-sectional view showing the induction heating device in FIG. 5.
Figure 7:
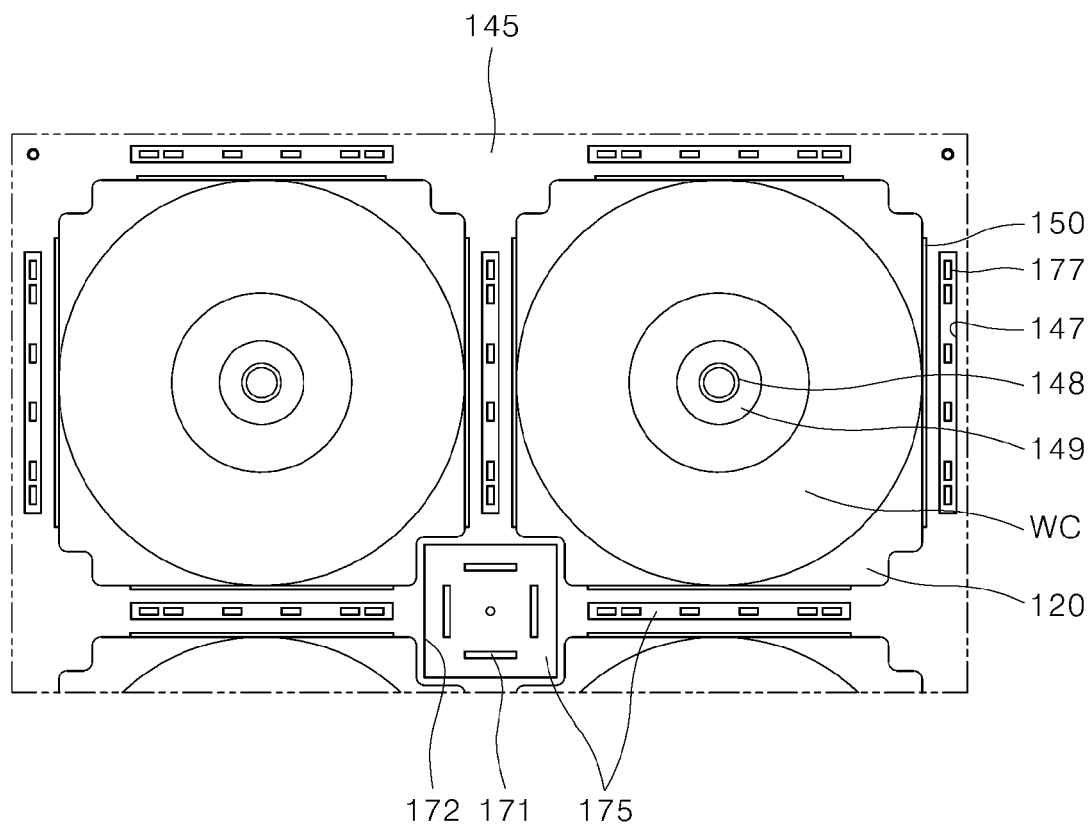
FIGS. 7 to 9 are partially enlarged views showing the induction heating device in FIG. 4.
Figure 8:
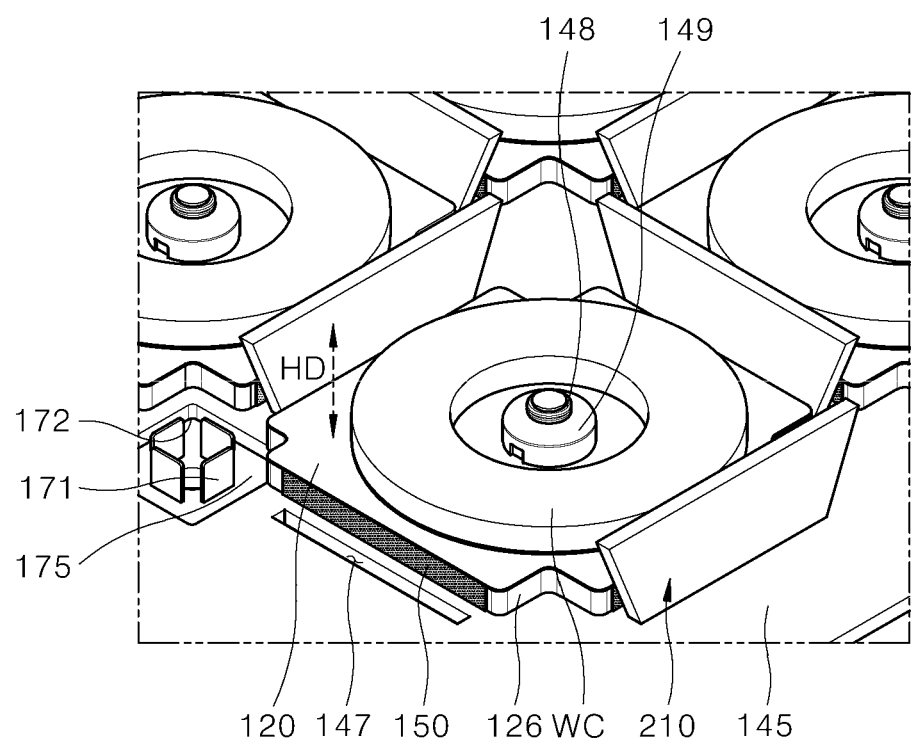
Figure 9:
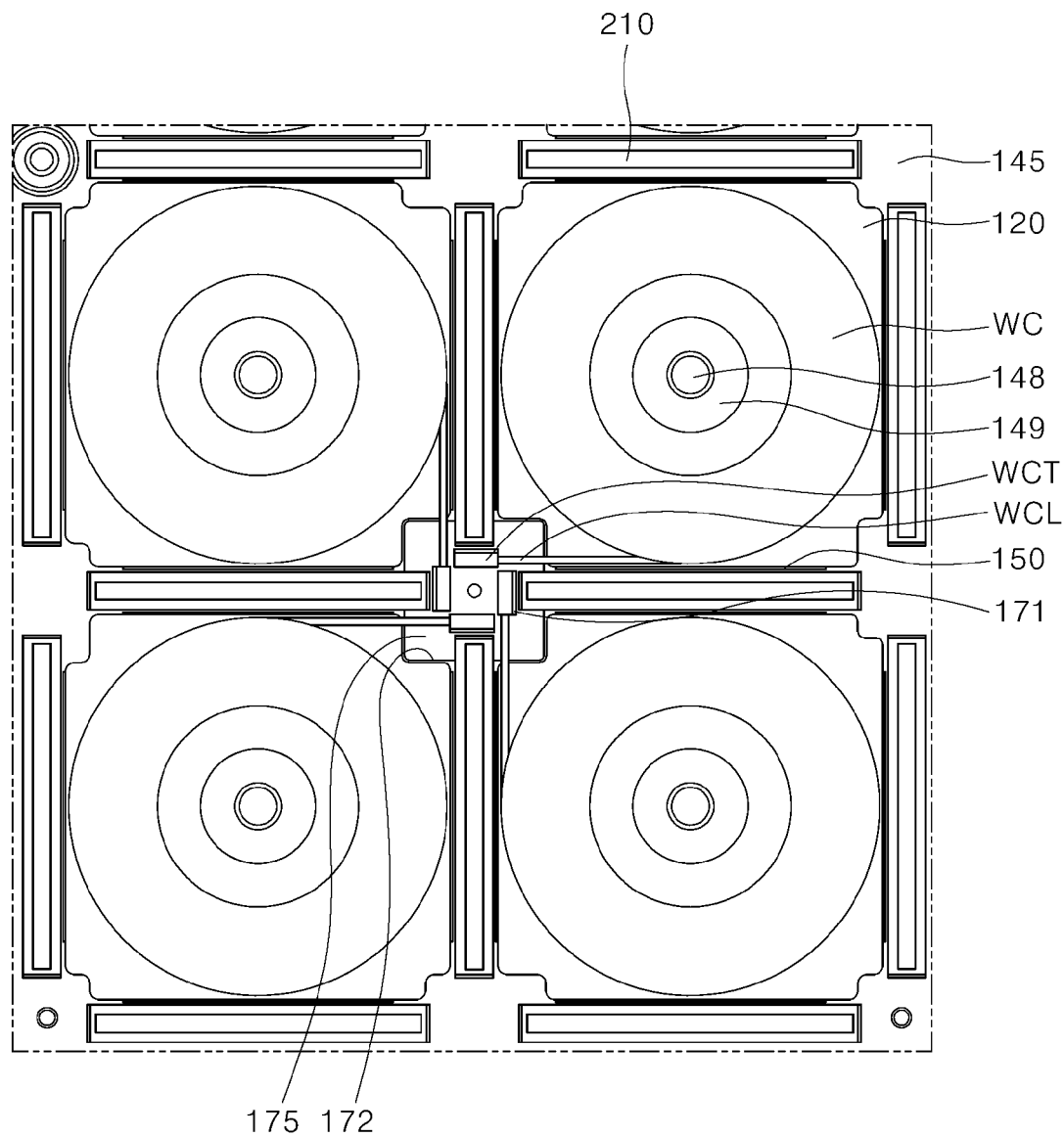

FIG. 4 illustrates an example of an induction heating device. FIG. 5 illustrates the induction heating device in FIG. 4. FIG. 6 illustrates the induction heating device in FIG. 5. FIGS. 7 to 9 illustrate the induction heating device in FIG. 4.

For convenience of explanation, in FIGS. 4 and 7 to 9, the cover plate is omitted. For convenience of explanation, in FIG. 7, a light guide is omitted.

Referring to FIGS. 4 to 9, an induction heating device 1 may include a case 125, a cover plate 119, a base plate 145, and an indicator substrate support 170, an indicator substrate 175, a light emitting element 177, a light guide 210, an electro-magnetic interference (EMI) filter 235, a switched mode power supply (SMPS) 236, a first blowing fan 240, a second blowing fan, a third blowing fan 260, an input interface 300, and a controller for input interface 310, a working coil assembly WCA, a resonance substrate R_PCB, and an inverter substrate IV_PCB.

The case 125 may include various types of components included in the induction heating device 1, for example, a working coil assembly WCA, a base plate 145, an indicator substrate support 170, an indicator substrate 175, a light emitting element 177, a light guide 210, an EMI filter 235, a SMPS 236, a first blowing fan 240, a second blowing fan 250, a third blowing fan 260, a controller for input interface 310, a working coil assembly WCA, a resonance substrate R_PCB, and an inverter substrate IV_PCB.

Further, the case 125 may include various types of devices related to the driving of the working coil WC (e.g., a power supply that provides an alternating current (AC) power (i.e., input power), a controller for an inverter substrate that controls the driving of components of the inverter substrate IV_PCB, a relay or a semiconductor switch that turns on or turns off the working coil WC, but details of various types of devices related to the driving of the working coil WC are omitted.

In some examples, the case 125 may be thermally insulated to prevent heat generated by the working coil WC from being leaking to the outside.

In some examples, the case 125 may include a lower plate LPA and a side plate SPA that extends upward along an edge of the lower plate LPA.

In some implementations, inlets and exhaust slits may be defined at a portion of an area of the lower plate LPA. Further, inlet slits IS_S and IS_L and an additional exhaust slit DS_S, may be defined in a remaining area of the lower plate LPA and the side plate SPA. Details of the inlet, inlet slit, and the exhaust slit are described below in detail.

In some implementations, an inlet and exhaust slit IDS may also be defined on the side plate SPA, and air may move to an inside of and to an outside of the case 125 through the inlet and exhaust slit IDS.

In some implementations, a barrier BA may be installed at a periphery of an area, on the lower plate LPA of the case 125, where the controller for the input interface 310 is installed, and the barrier BA may extend upward from the periphery of the area where the controller for the input interface 310 is installed.

Specifically, the barrier BA may be made of, for example, metal, and may prevent heat generated due to the driving of peripheral components from being introduced into the controller for the input interface 310 and the input interface 300.

In some implementations, a silicone rubber may be inserted between an upper end of the barrier BA and a lower surface of the top plate 115.

A mica sheet MS may be provided between the lower plate LPA and the inverter substrate IV_PCB to insulate the lower plate LPA and the inverter substrate IV_PCB, of the case 125.

Specifically, one surface of the mica sheet MS may be attached to the lower plate LPA through a sealant, and the other surface of the mica sheet MS may contact a heat sink (i.e., a heat sink that radiates the heat for the inverter described below) provided on the inverter substrate IV_PCB.

Further, the first blowing fan 240 and the second blowing fan 250 may be installed on the lower plate LPA of the case 125.

Specifically, the first blowing fan 240 may be installed on the lower plate LPA, and may suction outside air through the inlet provided in the lower plate LPA to discharge the air to the inverter substrate IV_PCB.

More specifically, the air may be discharged from the first blowing fan 240 to the inverter substrate IV_PCB and may be guided rearward through the inverter substrate IV_PCB. The air guided rearward may be discharged below the lower plate LPA (i.e., the outside of the case 125) through the exhaust slit provided on the lower plate LPA.

As described above, as heat generated by the inverter substrate IV_PCB is easily discharged below the lower plate LPA, it is possible to resolve the heating of the inverter substrate IV_PCB, in particular, the inverter. That is, a temperature of the inverter may be reduced due to the air discharged from the first blowing fan 240 to the inverter substrate IV_PCB.

In some implementations, the second blowing fan 250 may be installed on the lower plate LPA and may suction the outside air through the inlet provided in the lower plate LPA and may discharge the air to the resonance substrate R_PCB.

More specifically, the air may be discharged from the second blowing fan 250 to the resonance substrate R_PCB and may be guided rearward through the resonance substrate R_PCB. The air guided rearward may be discharged below the lower plate LPA (i.e., the outside of the case 125) through the exhaust slit provided in the lower plate LPA.

As described above, as the heat generated by the resonance substrate R_PCB is easily discharged below the lower plate LPA, it is possible to resolve the heating of the resonance substrate R_PCB, in particular, the resonance capacitor. That is, the temperature of the resonance capacitor may be reduced due to the air discharged from the second blowing fan 250 to the resonance substrate R_PCB.

The cover plate 119 may be coupled to an upper end of the case 125 (i.e., an upper end of the side plate SPA) to close an inside of the case 125, and an object may be disposed on the upper surface of the cover plate 119.

Specifically, the cover plate 119 may include a top plate 115 to place the object such as a cooking vessel, and the heat generated by the working coil WC may be transmitted to the object through the top plate 115.

The top plate 115 may be made of, for example, glass. Further, the input interface 300 may be flatly buried on the top plate 115 to receive input from a user and transmit the input to the controller for input interface 310, but is not limited thereto. In some examples, the input interface 300 may be installed at a position other than the top plate 115.

In some implementations, the input interface 300 may include a module that inputs a heating intensity or driving time of the induction heating device 1 desired by the user, and may be variously implemented with a physical button or a touch panel. Further, the input interface 300 may include, for example, a power button, a lock button, a power level control button (+,−), a timer control button (+,−), a charging mode button, and the like, and may display a specific image (e.g., an image of a heating zone, an image of a heating intensity, and the like).

Further, the input interface 300 may transfer the input received from the user to the controller for the input interface 310, and the controller for the input interface 310 may transfer the input to the above-described controller (i.e., the controller for the inverter substrate). Details thereof are omitted.

In some implementations, the working coil assembly WCA may include a working coil WC, a ferrite core 126, and a first mica sheet 120 (which is different from the above-mentioned mica sheet MS), an insulating member 150.

In some implementations, when the induction heating device 1 is a zone-free type induction heating device, a plurality of working coil assemblies WCAs may be present as shown in FIGS. 4 to 9, and a plurality of working coil assemblies (e.g., the WCAs) may be spaced apart from one another by a predetermined distance.

However, for convenience of description, one working coil assembly WCA is described.

Specifically, the working coil WC may include a conducting wire annularly wound with a plurality of times and may generate an alternating magnetic field. Further, the first mica sheet 120 and the ferrite core 126 may be sequentially disposed below the working coil WC.

In some implementations, the size of the working coil WC may not be reduced, and thus the AC magnetic field having the high-output may be generated.

The ferrite core 126 may be disposed below the working coil WC, and a core hole 127 (see FIG. 10) may be defined at a central portion of the ferrite core 126 to overlap with an annular inner side of the working coil WC in a height direction HD in which the indicator substrate, the base plate, the ferrite core, the first mica sheet, and the working coil are stacked.

Specifically, the base plate 145 may be disposed below the ferrite core 126, and a first mica sheet 120 may be disposed between the ferrite core 126 and the working coil WC.

The ferrite core 126 may be fixed to the first mica sheet 120 through the sealant, and may function to diffuse an alternating magnetic field generated by the working coil WC upward (i.e., above the ferrite core 126).

Further, an insulating member 150 may be attached to the outer portion of the ferrite core 126, and a corner of the ferrite core 126 may be curved or bent stepwise. For instance, the corner of the ferrite core 126 may be curved or bent inward so that the corner of the ferrite core 126 corresponds to the corner of the connection hole 172 described below.

In some implementations, the corners of the ferrite core 126 are located at both ends of the outer portion of the ferrite core 126, a detailed description of the above configuration is described below.

The first mica sheet 120 may be provided between the working coil WC and the ferrite core 126 and a first sheet hole 121 (see FIG. 10) may be provided at a center of the first mica sheet 120 to overlap with the annular inner side of the working coil WC in the height direction HD.

Specifically, the first mica sheet 120 may be fixed to the working coil WC and the ferrite core 126 through the sealant, and may prevent the heat generated by the working coil WC from being directly transferred to the ferrite core 126.

In some implementations, the induction heating device 1 may further include a second mica sheet fixed to the upper end of the working coil WC through the sealant and defining a second sheet hole at the center of the second mica sheet to overlap with the annular inner side of the working coil WC in a height direction HD thereof, but details of the above configuration are omitted.

The insulating member 150 may be attached to an outer portion of the ferrite core 126 to insulate between the working coil WC and the base plate 145.

Further, the insulating member 150 may include, for example, a Kapton tape.

As shown in FIGS. 7 to 9, the working coil assembly WCA may further include a packing gasket 149 that fixes the first mica sheet 120 and the ferrite core 126 to the base plate 145 and a sensor 148 installed at an upper end of the packing gasket 149 to detect a temperature.

In some implementations, the sensor 148 may detect the temperature of the top plate 115, the temperature of the working coil WC, and the operation of the working coil WC and may transmit temperature information or operation information to the above-mentioned controller for input interface 310.

As described above, the working coil assembly WCA includes the above-mentioned components, and details of components are described below.

The working coil assembly WCA is installed on an upper surface of the base plate 145.

Specifically, the ferrite core 126, the first mica sheet 120, and the working coil WC are sequentially stacked on the base plate 145, and the base plate 145 may be spaced upward from the indicator substrate support 170.

The base plate 145 may be integrated, for example, and may be made of aluminum (Al), but is not limited thereto.

In some implementations, the indicator substrate 175 may be installed on the upper surface of the indicator substrate support 170 and may be spaced downward from the base plate 145. Accordingly, an air flow path described below may be provided between the base plate 145 and the indicator substrate 175. Details thereof are described below.

In some implementations, as shown in FIGS. 7 to 9, a connection hole 172 may be provided in the space between the ferrite cores on the base plate 145 to provide a space of the connector 171. The connector 171 may be coupled (i.e., connected) to a terminal WCT (i.e., a common terminal) of the working coil WC disposed at the periphery of the connector 171.

The connection hole 172 may be provided at a position corresponding to an oblique direction of the ferrite core 126 so that the connection hole 172 has a shape corresponding to a shape of the corner of the ferrite core 126 (e.g., a rectangular shape of the connection hole 172 or a rectangular shape of the connection hole 172 in which a portion of the corner of the connection hole 172 is curved or bent stepwise). The connector 171 may protrude upward from the upper surface of the indicator substrate 175 to arrange wires and perform electrical connection of the working coils WCs (i.e., the connector 171 may be spaced inward apart from an edge of the connection hole 172), and details of the above configuration are described below.

In some examples, as shown in FIG. 8, the connector 171 may include four connector plates that are spaced apart from one another and that are arranged along a rectangular periphery defined by corners of four ferrite cores among the plurality of ferrite cores. The connection hole 172 may be disposed within the rectangular periphery defined by the corners of the four ferrite cores. The connector plates may protrude through the connection hole 172.

In some implementations, the working coil WC may include a plurality of electric terminals. For example, the working coil WC may include a common terminal WCT coupled to the connector 171 and an individual terminal connected to the resonance substrate described below (R_PCB in FIG. 5; i.e., the resonance capacitor). The common terminal WCT may be located at a position with other terminals of the surrounding working coils. For example, the common terminal WCT may be surrounded by four working coils that are disposed side by side. Further, the common terminal WCT and the individual terminal are respectively connected to the conducting wire WCL of the working coil WC, and the common terminal WCT is connected to the inverter substrate (IV_PCB in FIG. 5; i.e., the inverter) described above) through the connector 171. Details thereof are omitted.

The third blowing fan 260 may be installed at one side of the lower surface of the base plate 145 and may suction the outside air (e.g., outside cool air) through the inlet slits IS_L and IS_S defined in the lower plate LPA and the side plate SPA of the case 125, and may discharge the air to the air flow path defined between the base plate 145 and the indicator substrate 175.

More specifically, as shown in FIG. 5, an upper fence HDF is provided on the upper surface of the indicator substrate support 170 and the upper fence HDF is provided along an edge of the upper surface of the indicator substrate support 170. The air flow path may be surrounded by the lower surface of the base plate 145, the upper surface of the indicator substrate 175, and the upper fence HDF.

In some implementations, the base plate 145 may be integrated, and the air flow path may be surrounded by the lower surface of the base plate 145, the upper surface of the indicator substrate 175, and the upper fence HDF. The air may be discharged from the third blowing fan 260 to the air flow path and may be discharged to the outside of the case 125 through the additional exhaust slits DS_S. The air may be discharged by the third blowing fan 260 and may move along the air flow path, to reduce the temperature of the working coil WC and the temperature of the indicator (in particular, a plurality of light emitting elements 177).

That is, as the cool air is circulated along the air flow path, the temperature of the working coil WC and the temperature of the indicator (in particular, the plurality of light emitting elements 177 may be reduced. Further, the heating of the working coil WC and the indicator (in particular, the plurality of light emitting elements 177) generated due to radiation and a convection current may be resolved.

The light guide 210 may be installed on the base plate 145.

Specifically, the light guide 210 may be installed on the base plate 145 to be provided around the working coil WC. That is, four light guides 210 per one working coil WC may be installed around the working coil WC (i.e., light guides are arranged on four surfaces of the outer portions of the working coil).

The light guide 210 may display whether the working coil WC is driven and output intensity of the working coil WC through a light emitting surface (i.e., an upper surface).

As shown in FIGS. 7 and 8, a light guide installation hole 147 to install the light guide 210 may be defined in the space between the ferrite cores, in the base plate 145. That is, the light guide installation hole 147 may be defined in the base plate 145 at the position in which the light guide 210 is installed. Accordingly, the light guide installation hole 147 may also be defined around the working coil WC, and four light guide installation holes 147 per one working coil WC may be defined around the working coil WC.

In some examples, the light guide installation hole 147 may not overlap with a connection hole 172, and the number of the light guide installation holes 147 may be the same as the number of the light guides 210.

In some implementations, light emitted by the light emitting element 177 installed on the indicator substrate 175 may be transmitted to the light guide 210 through the light guide installation hole 147, and the light guide 210 may display the light emitted by the light emitting element 177 through the light emitting surface (i.e., the upper surface) provided at the upper end thereof.

The indicator substrate 175 may be installed on the upper surface of the indicator substrate support 170 to be spaced downward from the base plate 145, and a plurality of light emitting elements 177 may be installed on the upper surface of the indicator substrate 175.

The plurality of light emitting elements 177 may be, for example, light emitting diodes (LEDs), and the plurality of light emitting elements 177 may be symmetrical with respect to a center of the lower surface of the light guide 210, but is not limited thereto.

Further, the connector 171 coupled to the common terminal WCT of the above-mentioned working coil WC may be provided on the upper surface of the indicator substrate 175 and the connector 171 coupled to the common terminal WCT of the above-mentioned working coil WC may protrude upward from the connection hole 172.

The plurality of connectors 171 may be provided and details thereof are described below.

In some implementations, the indicator substrate 175 may have, for example, a form of a printed circuit board (i.e., PCB), and may drive a plurality of light emitting elements 177 based on the control signal received from the above-mentioned controller for the inverter substrate or the controller for the input interface 310. Further, although not shown in the figures, various types of components may further be installed on the indicator substrate 175 to drive the plurality of light emitting elements 177.

The indicator substrate support 170 may be coupled to the lower plate LPA to be disposed below the working coil WC.

Further, the above-described upper fence HDF may be provided on the upper surface of the indicator substrate support 170, and a lower fence LDF may be provided on the lower surface of the indicator substrate support 170.

That is, the upper fence HDF of the indicator substrate support 170 supports the lower surface of the base plate 145, and the lower fence LDF of the indicator substrate support 170 may be supported by the lower plate LPA.

Further, the indicator substrate 175 may be installed on the upper surface of the indicator substrate support 170 and the EMI filter 235, the SMPS 236, the resonance substrate R_PCB, and the inverter substrate IV_PCB may be installed on the lower surface of the indicator substrate support 170.

The EMI filter 235 may be installed on the lower surface of the indicator substrate support 170 and may receive the AC power from the above-described power supply. Further, the EMI filter 235 may reduce noise of the received AC power (i.e., electro-magnetic interference (EMI)) and provide the SMPS 236 with the AC power with reduced noise.

The SMPS 236 may be installed on the lower surface of the indicator substrate support 170, and may receive, from the EMI filter 235, the AC power with reduced noise. Further, the SMPS 236 may convert the received AC power into DC power and may provide the inverter substrate IV_PCB with the converted DC power.

The inverter substrate IV_PCB may be installed on the lower surface of the indicator substrate support 170 and may include the inverter that applies the resonance current to the working coil WC through the switching operation and a heat sink that radiates heat of the inverter.

The inverter IV may receive the DC power from the SMPS 236 and may apply a resonance current to the working coil WC by performing a switching operation based on the received DC power.

Further, a plurality of inverters may be provided, and the switching of the inverter may be controlled by the controller for the inverter substrate described above.

The inverter may include two switching elements, and the two switching elements may be alternately turned on and off based on a switching signal received from the controller for the inverter substrate. Further, high frequency alternating current (i.e., resonance current) may be generated through the switching of the two switching elements, and the generated high frequency alternating current may be applied to the working coil WC.

In some implementations, the inverter may be connected to a common terminal WCT of the above-mentioned working coil WC.

The resonance substrate R_PCB may be installed on the lower surface of the indicator substrate support 170, and may include a resonance capacitor that resonates by the switching of the inverter and a heat sink that radiates or dissipates heat generated by the resonance capacitor.

The resonance capacitor resonates, when a resonance current is applied to the working coil WC by the switching operation of the inverter. Further, when the resonance capacitor resonates, an amount of a current flowing through the working coil WC connected to the resonance capacitor C increases. That is, an eddy current may be induced into the object disposed above the working coil WC connected to the resonance capacitor through this process.

In some implementations, a plurality of resonance capacitors may be provided and may be connected to respective terminals of the above-mentioned working coil WC.

In some implementations, the induction heating device 1 may also perform a function for transmitting wireless power based on the above-mentioned configuration and feature.

That is, power is wirelessly supplied and is applied to a plurality of electronic devices. Electronic devices that use a technology for transmitting wireless power are charged by simply placing the electronic devices on a charging pad without connecting the electronic device to an additional charge connector. The electronic devices that transmit the wireless power may not require a wired cord or a charger, thereby improving portability of the electronic devices and reducing a size and a weight of the electronic devices.

The technology for transmitting the wireless power may use an electromagnetic induction method using a coil, a resonance method using resonance, and a radio wave radiation method in which electrical energy is converted into a microwave and the converted microwave is transmitted. The electromagnetic induction method uses electromagnetic induction between a primary coil (e.g., a working coil WC) provided in a device that transmits wireless power and a secondary coil provided in a device that receives wireless power to transmit the power.

In some examples, the induction heating method of the induction heating device 1 substantially has the same principle as the technology for transmitting the wireless power using electromagnetic induction in that the object is heated by electromagnetic induction.

In some examples, the induction heating device 1 may perform a function for transmitting the wireless power, as well as performing a function of induction heating. Further, an induction heating mode or a wireless power transmission mode may be controlled by the controller for the input substrate (or the controller for the input interface 310). Thus, the function for inductively heating the object or the function for transmitting the wireless power may be selectively performed as necessary.

The working coil assembly WCA shown in FIG. 4 is described below in detail.

Figure 10:
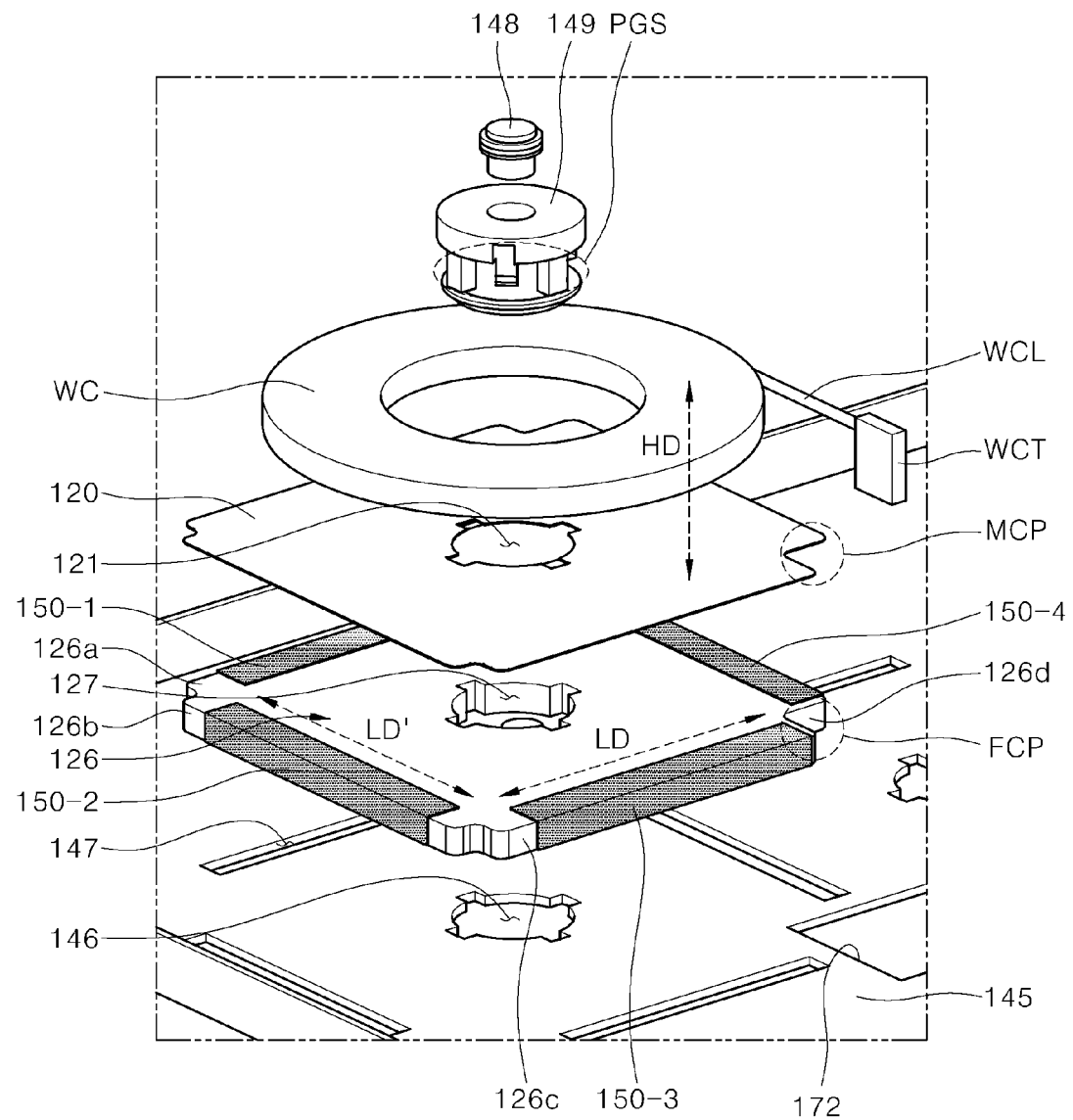
FIGS. 10 and 11 show an example of working coil assemblies of the induction heating device in FIG. 4.
Figure 11:
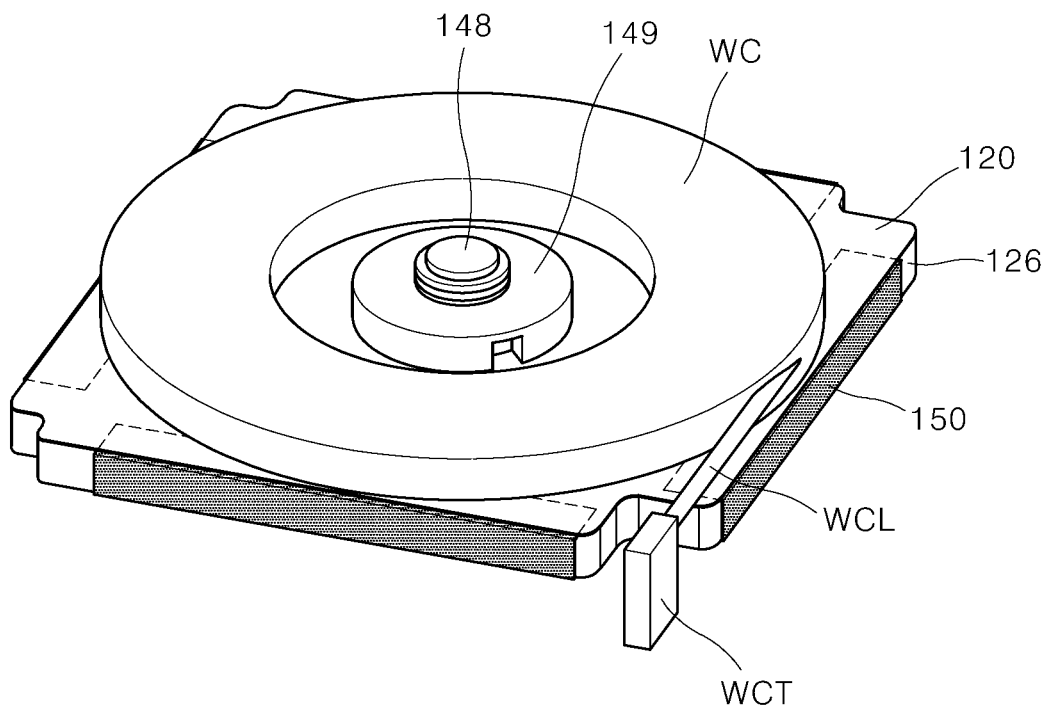

FIGS. 10 and 11 show the working coil assembly shown in FIG. 4.

In some implementations, the working coil assembly (WCA in FIG. 4) is summarized above. The matter which is not described above is described below.

Figure 3:
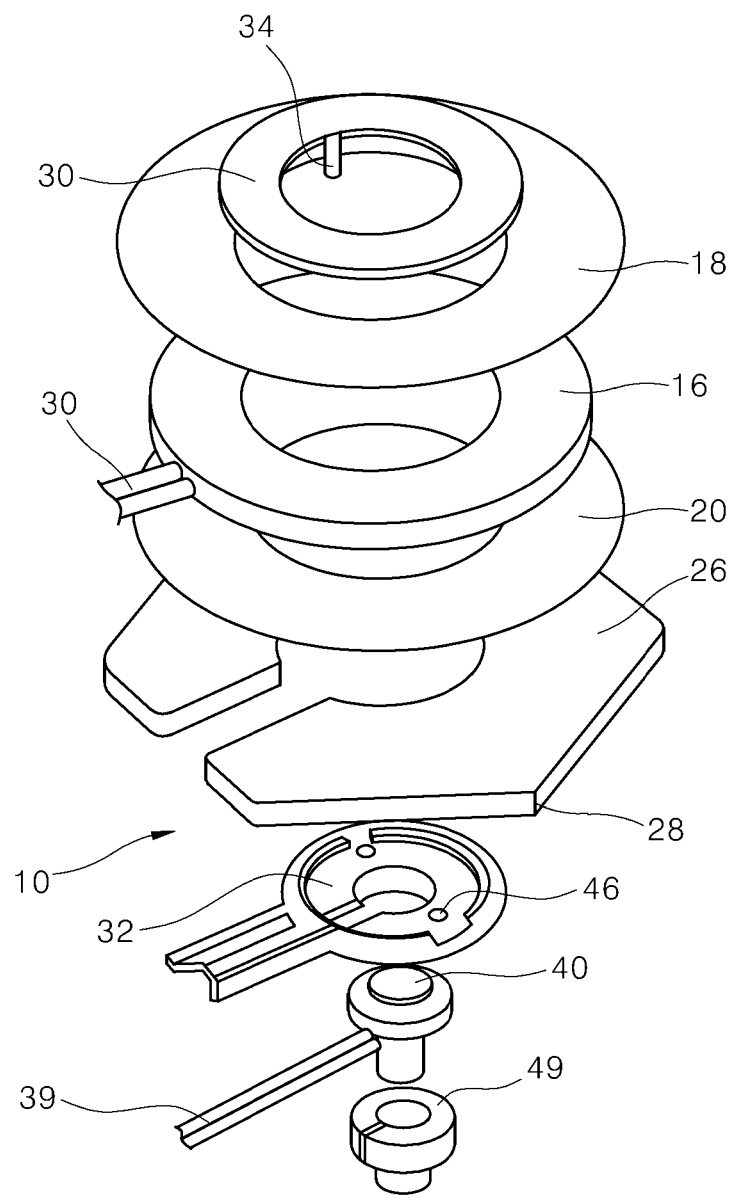

As described above, referring to FIGS. 10 and 11, the working coil assembly (WCA in FIG. 3) may include a working coil WC, a ferrite core 126, a first mica sheet 120, a second mica sheet, an insulating member 150, a packing gasket 149, and a sensor 148.

Specifically, a core hole 127 is defined at a center of the ferrite core 126 to overlap with an annular inner side of the working coil WC in the height direction HD. A first sheet hole 121 may be defined at a center of the first mica sheet 120 to overlap with the annular inner side of the working coil WC in the height direction HD. A plate hole 146 may be provided in the base plate 145 to overlap with the annular inner side of the working coil WC in the height direction HD Further, as shown in FIG. 10, the core hole 127, the first sheet hole 121, and the plate hole 146 may have the same shape.

A cross-sectional shape of an outer circumferential surface PGS of the packing gasket 149 fastened to the first sheet hole 121, the core hole 127, and the plate hole 146 may correspond to the shape of the first sheet hole 121.

Accordingly, the packing gasket 149 may fix the first mica sheet 120 and the ferrite core 126 to the base plate 145.

In some implementations, a plurality of plate holes 146 may be provided on the base plate 145 in consideration of the number of working coil assemblies.

In some implementations, the ferrite core 126 may include four outer portions, and the insulating member 150 may include four insulating members attached to the four outer portions of the ferrite core 126, respectively.

Specifically, the ferrite core 126 may include a first outer portion 126a, a second outer portion 126b, a third outer portion 126c, and a fourth outer portion 126d. The second outer portion 126b extends in a second longitudinal direction LD' orthogonal to a first longitudinal direction LD of the first outer portion 126a. The third outer portion 126c extends orthogonal to the second outer portion 126b and parallel to the longitudinal direction LD of the first outer portion 126a. The fourth outer portion 126d extends in the second longitudinal direction LD' that is orthogonal to the first outer portion 126a and the third outer portion 126c. The fourth outer portion 126d extends parallel to the longitudinal direction LD' of the second outer portion 126b.

In some implementations, the longitudinal directions LD of the first outer portion 126a and the third outer portion 126c may be the same, and the longitudinal directions LD' of the second outer portion 126b and the fourth outer portion 126d may be the same. In some examples, the longitudinal direction LD of the first outer portion 126a and the third outer portion 126c and the longitudinal direction LD' of the second outer portion 126b and fourth outer portion 126d may be perpendicular to each other.

Further, the insulating member 150 may include a first insulating member 150-1 to a fourth insulating member 150-4 attached to the first outer portion 126a to the fourth outer portion 126d, respectively.

The first insulating member 150-1 may be attached to the first outer portion 126a to surround an upper surface, a side surface, and a lower surface of the first outer portion 126a. The second insulating member 150-2 may be attached to the second outer portion 126b to surround an upper surface, a side surface, and a lower surface of the second outer portion 126b. Further, the third insulating member 150-3 may be attached to the third outer portion 126c to surround an upper surface, a side surface, and a lower surface of the third outer portion 126c. The fourth insulating member 150-4 may be attached to the fourth outer portion 126d to surround an upper surface, a side surface, and a lower surface of the fourth outer portion 126d.

The length corresponding to the longitudinal direction LD of the first insulating member 150-1 may be less than the length corresponding to the longitudinal direction LD of the first outer portion 126a. The length corresponding to the longitudinal direction LD' of the second insulating member 150-2 may be less than the length corresponding to the longitudinal direction LD' of the second outer portion 126b. Further, the length corresponding to the longitudinal direction LD of the third insulating member 150-3 may be less than the length corresponding to the longitudinal direction LD of the third outer portion 126c. The length corresponding to the longitudinal direction LD' of the fourth insulating member 150-4 may be less than the length corresponding to the longitudinal direction LD' of the fourth outer portion 126d.

In some implementations, the length corresponding to the longitudinal direction of the insulating member 150 may be used only to center portions of the outer portions 126a to 126d as little as possible. However, in one implementation of the present disclosure, in consideration of assembly tolerance, the insulating member 150 may have a length such that the insulating member 150 may cover a half or more of the outer portions 126a to 126d. The insulating member 150 covers the upper surface, the side surface, and the lower surface of the outer portions 126a to 126d to minimize a possibility that electric shock accidents may occur.

In some examples, when the working coil WC has a rectangular structure rather than a circular structure, an insulating member may be provided to cover not only the outer portions 126a to 126d of the ferrite core 126 but also corners (e.g., FCPs).

As described above, as the insulating member 150 is attached to the outer portions 126a to 126d of the ferrite core 126 made of a non-insulating material, the creepage distance between the lower surface of the working coil WC and the base plate 145 may meet a standard (e.g., 6.4 mm or more) to prevent electric shock accidents.

In some implementations, four corners (e.g., FCPs) of the ferrite core 126 may be curved or bent stepwise, and four corners (e.g., MCPs) of the first mica sheet 120 may also be curved or bent stepwise. The four corners (e.g., FCPs) of the ferrite core 126 may correspond to four corners (e.g., MCPs) of the first mica sheet 120.

Accordingly, a space for the connection hole 172 provided in the base plate 145 may be provided. Hereinafter, the shapes of the ferrite core 126 and the connection hole 172 are described in detail with reference to FIG. 12.

Figure 12:
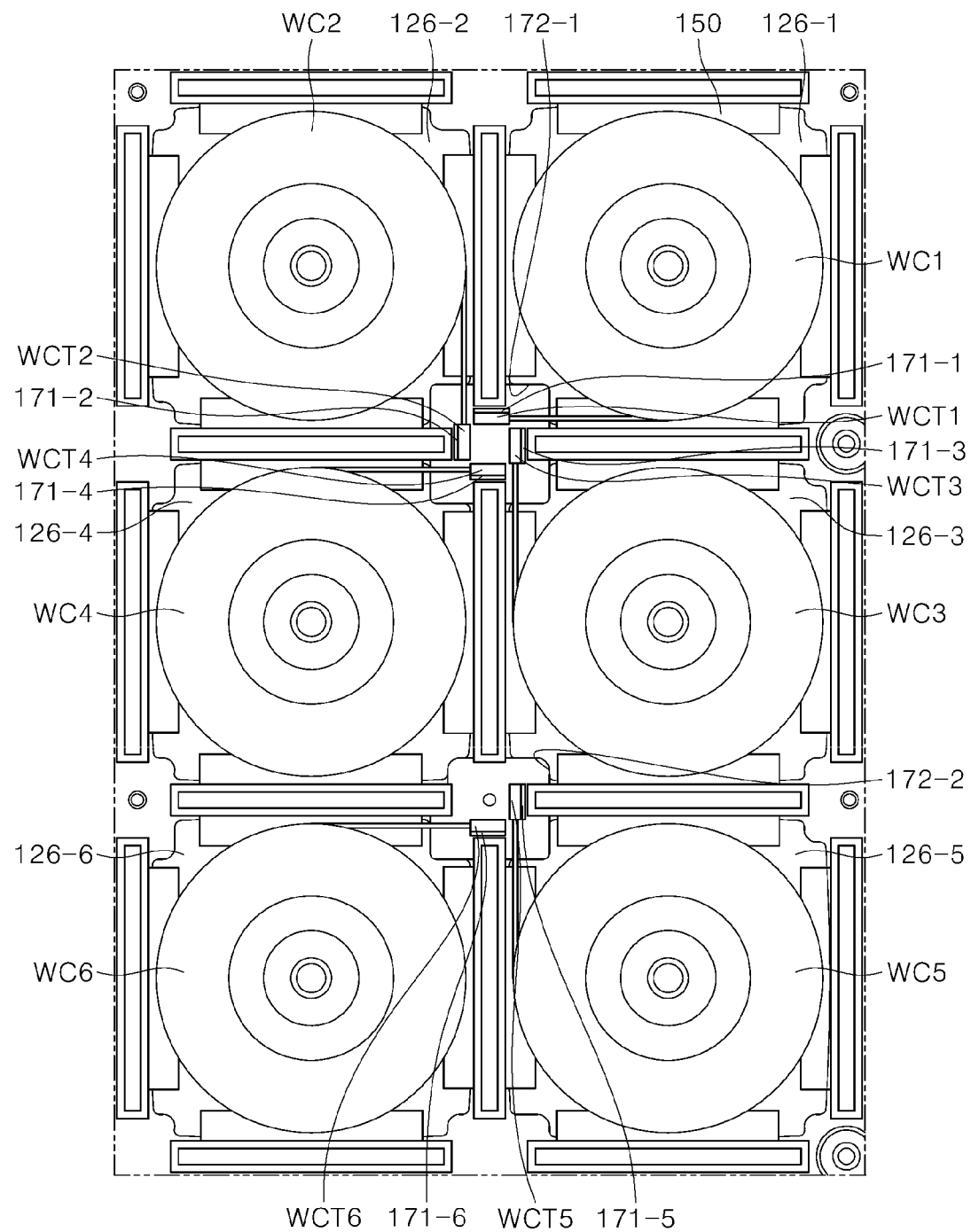
FIG. 12 is a plan enlarged view illustrating area "A" in FIG. 4.

FIG. 12 is an enlarged plan view of area "A" shown in FIG. 4.

In some implementations, in FIG. 12, a first mica sheet 120 is omitted for convenience of description. Further, the shape of the ferrite core and the shape of the connection hole described below may be equally applied to other areas other than area "A", and the shape of the ferrite core and the shape of the connection hole placed in the area "A" are described.

Referring to FIG. 12, a total of six working coils may be provided in the area "A" in FIG. 4, and six ferrite cores may be placed below six working coils, respectively. Further, as described above, corners of the ferrite core may be bent stepwise and the connection hole provided on the base plate may have a shape corresponding to a shape of a corner of the ferrite core.

In some examples, the working coil WC may include working coils WC1 to WC6 may be arranged in rows and columns of working coils. For instance, the working coils WC1 to WC6 may be arranged in three rows and two columns as shown in FIG. 12. The ferrite cores 126-1 to 126-6 may be arranged below the working coils WC1 to WC6, respectively, according to the rows and columns of the working coils WC1 to WC6.

Specifically, the working coil may include a first working coil WC1, a second working coil WC2, a third working coil WC3, a fourth working coil WC4, a fifth working coil WC5, and a sixth working coil WC6. The second working coil WC2 may be placed at one side of the first working coil WC1 and disposed at a rear side of the first working coil WC1. The fourth working coil WC4 may be placed in an oblique direction of the first working coil WC1, and may be disposed at a rear side of the second working coil WC2 and at one side of the third working coil WC3. The fifth working coil WC5 may be placed at a rear side of the third working coil WC3 and in an oblique direction of the fourth working coil WC4. The sixth working coil WC6 may be placed in an oblique direction of the third working coil WC3, and disposed at a rear side of the fourth working coil WC4 and at one side of the fifth working coil WC5.

Further, the ferrite core may include a first ferrite core 126-1 to a sixth ferrite core 126-6 disposed below the first working coil WC1 to the sixth working coil WC6, respectively.

The connection hole may include a first connection hole 172-1 and a second connection hole 172-2. The first connection hole 172-1 has a rectangular shape and is provided at an area surrounded by the first ferrite core 126-1 to the fourth ferrite core 126-4, and the second connection hole 172-2 has a rectangular shape in which a portion of corners thereof is bent stepwise and is provided in an area surrounded by the third ferrite core 126-3 to the sixth ferrite core 126-6.

For example, the first connection hole 172-1 may have a rectangular shape defined by a first corner of each of the first ferrite core 126-1, the second ferrite core 126-2, the third ferrite core 126-3, and the fourth ferrite core 126-4. The second connection hole 172-2 may have a rectangular shape defined by a second corner of each of the third ferrite core 126-3, the fourth ferrite core 126-4, the fifth ferrite core 126-5, and the sixth ferrite core 126-6.

Accordingly, the corner provided at one side of the rear side of the first ferrite core 126-1 may be bent inward to correspond to the corner provided at the other side of the front side of the first connection hole 172-1 and the corner provided at the other side of the rear side of the second ferrite core 126-2 may be bent inward to correspond to the corner provided at one side of the front side of the first connection hole 172-1. Further, the corner provided at one side of the front side of the third ferrite core 126-3 may be bent inward to correspond to the corner provided at the other side of the rear side of the first connection hole 172-1, and the corner provided at the other side of the front side of the fourth ferrite core 126-4 may be bent inward to correspond to the corner provided at one side of the rear side of the first connection hole 172-1.

The corner provided at one side of the rear side of the third ferrite core 126-3 may be bent inward to correspond to the corner provided at the other side of the front side of the second connection hole 172-2 and the corner provided at the other side of the rear side of the fourth ferrite core 126-4 may be bent inward to correspond to the corner provided at one side of the front side of the second connection hole 172-2.

Further, the corner provided at one side of the front side of the fifth ferrite core 126-5 may be bent inward to correspond to the corner provided at the other side of the rear side of the second connection hole 172-2 and the corner provided at the other side of the front side of the sixth ferrite core 126-6 may be bent inward to correspond to the corner provided at one side of the rear side of the second connection hole 172-2.

In some implementations, the connector may include a first connector 171-1 to a fourth connector 171-4 spaced inward apart from an edge of the first connection hole 172-1 and a fifth connector 171-5 and a sixth connector 171-6 spaced inward apart from an edge of the second connection hole 172-2.

As shown in FIG. 12, the first connector 171-1 may be parallel to the fourth connector 171-4 and the second connector 171-2 may be parallel to the third connector 171-3. The first connector 171-1 and the fourth connector 171-4 may be placed in a direction orthogonal to the second connector 171-2 and the third connector 171-3.

Specifically, the first connector 171-1 may be provided at one side of the rear side of the first working coil WC and may be coupled to the common terminal WCT1 of the first working coil WC1, and the second connector 171-2 may be provided at the other side of the rear side of the second working coil WC2 and may be coupled to the common terminal WCT2 of the second working coil WC2. Further, the third connector 171-3 may be provided at one side of the front side of the third working coil WC3 and may be coupled to the common terminal WCT3 of the third working coil WC3, and the fourth connector 171-4 may be provided at the other side of the front side of the fourth working coil WC4 and may be coupled to the common terminal WCT4 of the fourth working coil WC4. The fifth connector 171-5 may be provided at one side of the front side of the fifth working coil WC5 and may be coupled to the common terminal WCT5 of the fifth working coil WC5 and the sixth connector 171-6 may be provided at the other side of the front side of the sixth working coil WC6 and may be coupled to the common terminal WCT6 of the sixth working coil WC6.

As described above, the common terminal of the working coil may be coupled to only one connector. Accordingly, the common terminals WCT1 to WCT4 of the first working coil WC1 to the fourth working coil WC4 are coupled to the first connector 171-1 to the fourth connector 171-4 provided inside of the first connection hole 172-1, respectively, and the common terminals WCT5 and WCT6 of the fifth working coil WC5 and the sixth working coil WC6 are coupled to the fifth connector 171-5 and the sixth connector 171-6 provided inside of the second connection hole 172-2, respectively. The common terminals WCT1 to WCT6 coupled to the first connector 171-1 to the sixth connector 171-6, respectively, may not contact the ferrite cores 126-1 to 126-6, through the above-mentioned coupling method.

In some implementations, two connectors (i.e., 171-5 and 171-6) may be provided inside of the second connection hole 172-2 and an available space of the second connection hole 172-2 is greater than an available space of the first connection hole 172-1.

Therefore, the available space of the second connection hole 172-2 may be used to expand the size of the ferrite core.

That is, as described above, when the ferrite core has a greater size (i.e., an area), an amount of magnetic flux leaking below the working coil is reduced, so that high output may be obtained with a small amount of current. Further, when a large-sized ferrite core is used, loss of conduction of the inverter and the heating of the working coil may be reduced by reducing the magnitude of the resonance current.

In some implementations, the corner provided at one side of the front side of the second connection hole 172-2 may be bent stepwise (i.e., may be bent inward) and the shape of the corner provided at one side of the front side of the second connection hole 172-2 may be different from the shape of the corner of the connection hole. An area (i.e., a size) of the corner provided at the other side of the rear side of the fourth ferrite core 126-4 may be greater than the area of each of other corners of the ferrite core.

Further, the high output may be obtained based on a small amount of current by increasing the corner of the fourth ferrite core 126-4 and loss of the conduction of the inverter and the heating of the working coil may be reduced.

In some examples, other corners of the second connection hole 172-2 rather than the corner of the second connection hole 172-2 or the corner of the first connection hole 172-1 may be bent stepwise based on the position of the common terminal of the working coil. In this case, an area of any one of the ferrite cores, other than the fourth ferrite core 126-4 may be increased.

However, for convenience of description, in one implementation of the present disclosure, the corner provided at one side of the front side of the second connection hole 172-2 may be bent stepwise and the corner provided at the other side of the rear side of the fourth ferrite core 12604 may be bent.

In some implementations, as shown in FIG. 12, the area of the corner irrelevant to the connection hole, among corners of the ferrite core, may be greater than the area of the corner corresponding to the connection hole, so that the large-sized ferrite core may be provided.

In some implementations, the induction heating device 1 may use the high-output working coil, thereby improving performance and reliability of the product.

In some implementations, the induction heating device 1 may prevent electric shock accidents by preventing contact between the terminal of the ferrite core and the terminal of the working coil, thereby improving user satisfaction.

While the present disclosure has been described with reference to exemplary drawings thereof, it is to be understood that the present disclosure is not limited to implementations and drawings in the present disclosure, and various changes can be made by the skilled person in the art within the scope of the technical idea of the present disclosure. Although working effects obtained based on configurations of the present disclosure are not explicitly described while describing the implementations of the present disclosure, effects predictable based on the configurations have also to be recognized.

What is claimed is:

1. An induction heating device, comprising:
   a working coil comprising a conducting wire that is wound in an annular shape and that is connected to a plurality of electric terminals;
   a ferrite core disposed vertically below the working coil and configured to direct upward an alternating magnetic field generated by the working coil, the ferrite core defining a stepped portion at each corner of the ferrite core;
   a base plate that supports the ferrite core on an upper surface of the base plate and that defines a connection hole having a shape corresponding to the corner of the ferrite core; and
   an indicator substrate disposed vertically below the base plate, the indicator substrate comprising a connector that is disposed on an upper surface of the indicator substrate, that is coupled to one or more of the plurality of electric terminals, and that protrudes upward through the connection hole,
   wherein the connection hole is defined at an oblique position with respect to the ferrite core and has a rectangular shape, and
   wherein the stepped portion of the ferrite core is curved inward to thereby accommodate a corner of the connection hole.

2. The induction heating device of claim 1, wherein the connector is spaced apart from an edge of the connection hole, and
   wherein the connector is coupled to the one or more of the plurality of electric terminals without contacting the ferrite core.

3. The induction heating device of claim 1, wherein the working coil comprises:
   a first working coil;
   a second working coil disposed at a first side of the first working coil;
   a third working coil disposed at a second side of the first working coil and disposed at an oblique position relative to the second working coil;
   a fourth working coil that is disposed at an oblique position relative to the first working coil and that faces the second working coil and the third working coil;
   a fifth working coil that is disposed at a side of the third working coil and that is disposed at an oblique position relative to the fourth working coil; and
   a sixth working coil that is disposed at a side of the fourth working coil, that is disposed at an oblique position relative to the third working coil, and that faces the fourth working coil and the fifth working coil,
   wherein the ferrite core comprises a first ferrite core disposed vertically below the first working coil, a second ferrite core disposed vertically below the second working coil, a third ferrite core disposed vertically below the third working coil, a fourth ferrite core disposed vertically below the fourth working coil, a fifth ferrite core disposed vertically below the fifth working coil, a sixth ferrite core disposed vertically below the sixth working coil, and
   wherein the connection hole comprises:
      a first connection hole that has a rectangular shape defined by a first corner of each of the first ferrite core, the second ferrite core, the third ferrite core, and the fourth ferrite core, and
      a second connection hole that has a rectangular shape defined by a second corner of each of the third ferrite core, the fourth ferrite core, the fifth ferrite core, and the sixth ferrite core.

4. The induction heating device of claim 3, wherein the first corner of each of the first ferrite core, the second ferrite core, the third ferrite core, and the fourth ferrite core is curved inward and respectively corresponds to one of four corners of the first connection hole, and
   wherein the second corner of each of the third ferrite core, the fourth ferrite core, the fifth ferrite core, and the sixth ferrite core is curved inward and respectively corresponds to one of four corners of the second connection hole.

5. The induction heating device of claim 3, wherein the connector comprises a plurality of connectors comprising:

four connectors disposed in the first connection hole and spaced apart from an edge of the first connection hole; and two connectors disposed in the second connection hole and spaced apart from an edge of the second connection hole.

6. The induction heating device of claim 5, wherein each of the first working coil, the second working coil, the third working coil, and the fourth working coil extends to one of the four connectors disposed in the first connection hole and is connected to one of the plurality of electric terminals, and wherein each of the fifth working coil and the sixth working coil extends to the two connectors disposed in the second connection hole and is connected to one of the plurality of electric terminals.

7. The induction heating device of claim 5, wherein a creepage distance between a lower surface of the working coil and the base plate is greater than or equal to 6.4 mm.

8. The induction heating device of claim 1, further comprising a first mica sheet disposed between the working coil and the ferrite core and configured to block heat transfer from the working coil to the ferrite core.

9. The induction heating device of claim 8, wherein the first mica sheet comprises a stepped part that is curved inward from a corner of the first mica sheet and that corresponds to the stepped portion of the ferrite core.

10. The induction heating device of claim 8, wherein the first mica sheet is fixed to the working coil and the ferrite core by a sealant.

11. The induction heating device of claim 8, further comprising a second mica sheet fixed to an upper end of the working coil by a sealant.

12. The induction heating device of claim 8, wherein the indicator substrate, the base plate, the ferrite core, the first mica sheet, and the working coil are stacked along a height direction, wherein the ferrite core defines a core hole at a center area of the ferrite core that corresponds to an annular inner side of the working coil, wherein the first mica sheet defines a first sheet hole at a center area of the first mica sheet that corresponds to the annular inner side of the working coil, wherein the base plate defines a plate hole at a position corresponding to the annular inner side of the working coil, and wherein the core hole, the first sheet hole, and the plate hole have a same shape and are coaxially arranged along the height direction.

13. The induction heating device of claim 12, further comprising:

a packing gasket configured to fix the first mica sheet and the ferrite core to the base plate, wherein an outer circumferential surface of the packing gasket is fastened to the first sheet hole, the core hole, and the plate hole, and has a cross-sectional shape corresponding to a shape of the first sheet hole; and a sensor disposed at an upper end of the packing gasket and configured to detect a temperature of the packing gasket.

14. The induction heating device of claim 1, further comprising an insulating member attached to an outer portion of the ferrite core and configured to insulate between the working coil and the base plate.

15. The induction heating device of claim 14, wherein the insulating member covers an upper surface, a side surface, and a lower surface of the outer portion of the ferrite core, and wherein a length of the insulating member in a longitudinal direction of the insulating member is less than a length of the outer portion of the ferrite core in the longitudinal direction.

16. The induction heating device of claim 14, wherein the outer portion of the ferrite core is disposed between corners of the ferrite core.

17. The induction heating device of claim 1, further comprising:

an indicator substrate support comprising an upper surface that supports the indicator substrate;

an inverter substrate disposed on a lower surface of the indicator substrate support, the inverter substrate comprising an inverter configured to apply a resonance current to the working coil and a first heat sink configured to dissipate heat generated by the inverter; and a resonance substrate disposed on the lower surface of the indicator substrate support, the resonance substrate comprising a resonance capacitor configured to generate the resonance current and a second heat sink configured to dissipate heat generated by the resonance capacitor.

18. The induction heating device of claim 17, wherein the plurality of electric terminals comprise a first terminal connected to the resonance capacitor, and a second terminal connected to the inverter through the connector.

19. The induction heating device of claim 1, wherein the working coil comprises a plurality of working coils, and the ferrite core comprises a plurality of ferrite cores disposed vertically below the plurality of working coils, respectively, wherein the connector comprises four connector plates that are spaced apart from one another and that are arranged along a rectangular periphery defined by corners of four ferrite cores among the plurality of ferrite cores, and wherein the connection hole is disposed within the rectangular periphery defined by the corners of the four ferrite cores.

* * * * *